US008937599B2

(12) United States Patent
Aono

(10) Patent No.: US 8,937,599 B2
(45) Date of Patent: *Jan. 20, 2015

(54) INPUT APPARATUS

(75) Inventor: Tomotake Aono, Yokohama (JP)

(73) Assignee: Kyocera Corporation, Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/120,812

(22) PCT Filed: Dec. 25, 2009

(86) PCT No.: PCT/JP2009/007315
§ 371 (c)(1),
(2), (4) Date: Mar. 24, 2011

(87) PCT Pub. No.: WO2010/073728
PCT Pub. Date: Jul. 1, 2010

(65) Prior Publication Data
US 2011/0181538 A1    Jul. 28, 2011

(30) Foreign Application Priority Data
Dec. 25, 2008   (JP) ................. 2008-331304

(51) Int. Cl.
  G06F 3/041     (2006.01)
  G06F 3/01      (2006.01)
  G06F 3/0488    (2013.01)
  H04M 1/725     (2006.01)
(52) U.S. Cl.
  CPC .............. *G06F 3/041* (2013.01); *G06F 3/016* (2013.01); *G06F 3/0414* (2013.01); *G06F 3/0488* (2013.01); *H04M 1/72519* (2013.01); *H04M 2250/22* (2013.01)
  USPC .......................... 345/173; 345/174; 178/18.06

(58) Field of Classification Search
  USPC .................... 345/173–178; 178/18.01–18.11; 715/808
  See application file for complete search history.

(56) References Cited

U.S. PATENT DOCUMENTS

| 6,295,052 | B1 | 9/2001 | Kato et al. |
| 6,377,685 | B1 | 4/2002 | Krishnan |
| 7,609,178 | B2 | 10/2009 | Son et al. |
| 7,614,008 | B2 | 11/2009 | Ording |
| 7,685,538 | B2 | 3/2010 | Fleck et al. |

(Continued)

FOREIGN PATENT DOCUMENTS

| CN | 1216620 A | 5/1999 |
| EP | 1 967 290 A1 | 9/2008 |
| EP | 2 000 896 A2 | 12/2008 |
| GB | 2 402 105 A | 12/2004 |
| JP | A-5-143226 | 6/1993 |

(Continued)

OTHER PUBLICATIONS

International Search Report for International Patent Application No. PCT/JP2009/007315, mailed on Mar. 16, 2010 (w/ English translation).

(Continued)

*Primary Examiner* — Jimmy H Nguyen
(74) *Attorney, Agent, or Firm* — Oliff PLC

(57) ABSTRACT

An input apparatus has a display unit for displaying an input object, an input unit for receiving a pressure input to the input object, a load detection unit for detecting a pressure load on the input unit, and a control unit for controlling to receive the pressure input when the pressure load detected by the load detection unit satisfies a load standard. The control unit controls such that the load standard for receiving the pressure input to the input object displayed in an interrupting manner is higher than the load standard for receiving the pressure input to the input object which has been displayed.

3 Claims, 10 Drawing Sheets

(56) References Cited

U.S. PATENT DOCUMENTS

| | | | |
|---|---|---|---|
| 2002/0110237 | A1 | 8/2002 | Krishnan |
| 2003/0151589 | A1 | 8/2003 | Bensen et al. |
| 2004/0008191 | A1 | 1/2004 | Poupyrev et al. |
| 2004/0021643 | A1 | 2/2004 | Hoshino et al. |
| 2005/0044500 | A1 | 2/2005 | Orimoto et al. |
| 2006/0001654 | A1 | 1/2006 | Smits |
| 2006/0053387 | A1 | 3/2006 | Ording |
| 2006/0061597 | A1 | 3/2006 | Hui |
| 2008/0024459 | A1 | 1/2008 | Poupyrev et al. |
| 2008/0122315 | A1 | 5/2008 | Maruyama et al. |
| 2008/0216001 | A1 | 9/2008 | Ording et al. |
| 2008/0252616 | A1 | 10/2008 | Chen |
| 2009/0135147 | A1 | 5/2009 | Hsu et al. |
| 2010/0026640 | A1* | 2/2010 | Kim et al. .......... 345/173 |
| 2010/0026647 | A1* | 2/2010 | Abe et al. .......... 345/173 |
| 2010/0039393 | A1* | 2/2010 | Pratt et al. .......... 345/173 |
| 2010/0103127 | A1 | 4/2010 | Park et al. |
| 2011/0169765 | A1* | 7/2011 | Aono .......... 345/173 |
| 2011/0181539 | A1* | 7/2011 | Aono .......... 345/173 |

FOREIGN PATENT DOCUMENTS

| | | |
|---|---|---|
| JP | A-6-161660 | 6/1994 |
| JP | A-8-76925 | 3/1996 |
| JP | A-9-62446 | 3/1997 |
| JP | A-10-171600 | 6/1998 |
| JP | A-2001-331245 | 11/2001 |
| JP | A-2005-196810 | 7/2005 |
| JP | A-2005-332063 | 12/2005 |
| JP | A-2006-311224 | 11/2006 |
| JP | B2-4039344 | 1/2008 |
| JP | A-2008-107906 | 5/2008 |
| JP | A-2008-123453 | 5/2008 |
| JP | A-2006-195734 | 7/2008 |
| JP | A-2010-152716 | 7/2010 |
| JP | A-2010-152736 | 7/2010 |
| WO | WO 00/65419 A2 | 11/2000 |

OTHER PUBLICATIONS

Written Opinion for International Patent Application No. PCT/JP2009/007315, mailed on Mar. 16, 2010 (w/ partial English translation).

Dec. 13, 2011 Office Action issued in U.S. Appl. No. 13/120,814.
International Search Report issued in Application No. PCT/JP2009/007318; Dated Apr. 13, 2010 (with translation).
International Search Report dated Apr. 13, 2010 in corresponding International Application No. PCT/JP2009/007316 (with translation).
Jun. 20, 2011 Office Action issued in U.S. Appl. No. 13/120,814.
Aug. 25, 2011 Office Action issued in U.S. Appl. No. 13/121,138.
U.S. Appl. No. 13/120,814.
U.S. Appl. No. 13/121,138.
Apr. 12, 2013 Office Action issued in Chinese Patent Application No. 200980151358.1 (with translation).
Feb. 5, 2013 Office Action issued in European Patent Application No. 09834535.8.
Mar. 29, 2012 Office Action issued in U.S. Appl. No. 13/121,138.
Jun. 9, 2013 Office Action issued in Chinese Patent Application No. 200980151363.2 (with translation).
Aug. 26, 2013 Office Action issued in European Patent Application No. 09834534.1.
Nov. 12, 2012 Office Action issued in Korean Patent Application No. 10-2011-7012582 (with English Translation).
Nov. 23, 2012 Office Action issued in U.S. Appl. No. 13/121,138.
Nov. 6, 2012 Office Action issued in Korean Patent Application No. 10-2011-7012990 (with English Translation).
Nov. 22, 2013 Office Action issued in European Patent Application No. 09 834 534.1.
Mar. 26, 2013 Notification of Reason for Refusal issued in Japanese Patent Application No. 2011-107517 (with translation).
Mar. 26, 2013 Notification of Reason for Refusal issued in Japanese Patent Application No. 2011-107616 (with translation).
Feb. 5, 2013 Search Report issued in European Patent Application No. 09834534.1.
European Search Report issued in European Patent Application No. 09834534.1 dated May 8, 2012.
European Search Report issued in European Patent Application No. 09834535.8 dated May 10, 2012.
Office Action issued in U.S. Appl. No. 13/120,814; mailed May 29, 2014.

* cited by examiner (A)  (B)  (C)

(A)

(B)

(C)

(A)

(B)

(C)

(D)

(A)

(B)

INPUT APPARATUS

CROSS REFERENCE TO RELATED APPLICATION

This application claims priority to and the benefit of Japanese Patent Application No. 2008-331304 filed on Dec. 25, 2008, the entire contents of which are incorporated herein by reference.

TECHNICAL FIELD

The present invention relates to input apparatuses, and more particularly, to input apparatuses having touch panels.

BACKGROUND ART

For mobile terminals such as mobile phones, various input apparatuses used by users to operate the terminals have been developed according to functions and usages of each of the terminals. In many cases, an input apparatus has mechanical keys or buttons arranged in advance on a surface of a body such that a user performs an input operation by directly pressing a finger or the like to the keys.

The mechanical keys (for example, a numerical keypad) of the input apparatus of the terminal are normally arranged in advance to suit a main usage of the terminal. Accordingly, it is generally not possible to change a physical arrangement of keys, once defined, later.

Recently, a variety of functions are incorporated in small mobile terminals. For example, the mobile phones have a digital camera function and a music player function. There are mobile terminals such as a mobile phone having numerous supplementary functions incorporated therein in addition to a function for a main usage of the terminal, and PDA (Personal Digital Assistant: mobile information terminal) having, as a single terminal, a plurality of main usages such as schedule management, an address book and the like. If such terminals have keys fixedly arranged, it may inconvenience the user significantly in using particular functions.

In order to resolve such inconvenience, there is disclosed an input apparatus having a touch panel designed such that a transparent input unit is arranged overlapping a front face of a liquid crystal display constituting a display unit (for example, see Patent Document 1). The input apparatus having such a touch panel is generally configured such that, when a graphical image of operation keys or buttons displayed on a display screen of the touch panel is pressed, the input unit at a corresponding position receives an input.

A folding mobile phone described in the above Patent Document 1 can display keys arranged arbitrarily on the display screen of the touch panel to receive operation inputs by the user, and thus key arrangements can be designed as desired. That is, this mobile phone provides an excellent operability as capable of changing the arrangement of the keys to suit a function of the terminal when each function of the terminal is switched. For example, when the user uses the digital camera function incorporated in the mobile phone, this mobile phone displays an operation unit for a digital camera on the touch panel and receives operation inputs. On the other hand, when the user inputs characters to create a message and the like, this mobile phone displays a keyboard like a personal computer (PC) on the touch panel and receives inputs. As stated above, this mobile phone having the touch panel can optimize a single input apparatus to suit each of a plurality of functions and receive operation inputs.

In addition, since the input apparatus having the touch panel receives an input in the form of a user's direct contact (touch) of a finger or the like to the graphical image (of the key or the button) displayed on the display unit, the user can operate it highly intuitively. That is, the user operates the input apparatus by directly touching the key or the button displayed on the screen with a finger or the like following a guide displayed on the screen of the touch panel. Accordingly, the user can control the terminal extremely easily through intuitive operations following the guide displayed on the screen, which even offers an effect to reduce erroneous operations as a result.

In recent years, the mobile terminal having the touch panel as stated above enables the user not only to make a normal telephone call and to perform operation inputs for creating a message but also to perform operation inputs to view (browse) contents delivered through the internet and websites. In addition, the input apparatuses having the touch panel are commonly used for not only the mobile terminals but also, for example, ATMs (Automatic Teller Machines) of a bank and the like and ticket vending machines at train stations. Moreover, in stores such as fast-food shops, terminal equipment with the input apparatus having the touch panel as above is used by a clerk to process orders from customers. When the touch panel is employed as the input apparatus, the mechanical buttons and keys such as a keyboard are not essential components any more. Accordingly, since only a small area is required to arrange mechanical buttons and the like on the terminal apparatus, it enables downsizing of overall terminal apparatus. Therefore, it offers a broader choice of installation sites of the terminal apparatus in stores and train stations.

In addition, the touch panel employed as an input apparatus eliminates necessity of separately having a display unit for displaying various information and an input unit for receiving operation inputs by the user as individual function units like a general design of conventional apparatus, and enables to configure the information display unit and the input unit on the same screen. Accordingly, it is possible, for example, to display keys of a keyboard on the touch panel for receiving an input by the user while displaying a result of the input near the keyboard on the touch panel. Thereby, the user can perform an operation input and confirm the result of the input on the same screen.

As described above, the touch panel provides merits to enable to configure the input unit and the display unit on the same screen and also to enable intuitive operation inputs. For that reason, the number of various terminal apparatuses having such input apparatus has been increased more and more.

However, the input apparatus with the touch panel has a specific problem because of its configuration to have the input unit and the display unit on the same screen and to receive the intuitive operation input. The problem is that, if timing for the terminal to receive the operation input through the touch panel does not match timing for the user to actually perform the operation input to the touch panel, the terminal may receive an operation input unintended by the user.

For example, it is considered a case, as shown in FIG. 9(A), in which a numerical keypad for receiving operation input is displayed on the touch panel 300 by a message creation function of the mobile phone and a result of the input is displayed in a display area in an upper area of the touch panel 300. FIG. 9(A) shows a state in which the user touches (performs a pressure input to) the numerical keypad on the touch panel 300 and thereby characters "I will be heading very soon . . . " are displayed. At this point, since the user has not finished creating the message yet, the user tries to continue an input operation by touching the numerical keypad on the touch panel 300. It is to be noted that, since it is a conventional art known as a "multi-tap input method" to input each character in a message using a numerical keypad of a mobile terminal, such as the mobile phone, by transiting kana characters associated with each key according to the number of input times of the key, a description thereof is omitted.

If the mobile phone receives an incoming call with its telephone function while receiving input of characters in the message as stated above, the touch panel 300 of the mobile phone displays a screen as shown in FIG. 9(B). In this manner, it is general to display information such as a reception of an incoming call or a message that requires immediacy in an interrupting manner on a screen currently in use, even when another function such as the message creation function is being used. It may be considered that, at the moment that the user tries to touch the touch panel 300 to input a next character in the message in a state shown in FIG. 9(A), the display of the touch panel 300 is changed to an incoming call screen as shown in FIG. 9(B). In this case, the user may touch a spot, where the user intended to touch before the display is changed, immediately after the display is changed.

For example, in creating the message shown in FIG. 9(A), if the display is changed to the incoming call screen shown in FIG. 9(B) at the moment that the user tries to touch a key "6 (Ha)" on the touch panel 300, the user may touch a "Reject" key on the touch panel 300 shown in FIG. 9(B). Accordingly, it results in rejecting the incoming call by the user unintentionally even if it was call from a person with whom the user needs to talk.

In addition, in creating the message shown in FIG. 9(A), if the display is changed to the incoming call screen shown in FIG. 9(B) at the moment that the user tries to touch a key "4 (Ta)" on the touch panel 300, the user may touch an "Answer" key on the touch panel 300. Accordingly, it results in answering the incoming call by the user unintentionally even if it was a call from a person with whom the user does not wish to talk.

Similar cases may happen not only when receiving an incoming call but also when receiving a message. For example, if the mobile terminal receives a new message while creating another message, the display may be changed to a screen for selecting whether to open the new message received at the moment that the user tries to input a next character. In such a case, the user may unintentionally perform an operation to open the new message, resulting in opening Spam (nuisance message).

In addition, for example, a pop-up advertisement may be displayed in an interrupting manner on the touch panel 300 as shown in FIG. 9(D) when a user views an internet website by using a web browser function of the mobile phone as shown in FIG. 9(C). The web browser function enables jump to a corresponding page or website in response to a touch (pressure input) to underlined characters by the user. In this case, the pop-up advertisement shown in FIG. 9(D) may be displayed at the moment that the user tries to touch characters "Transfer Guide" displayed on the touch panel 300 shown in FIG. 9(C). As a result, the user unintentionally touches the pop-up advertisement.

It is reported recently that there is so-called phishing which prompts the user to access a fraudulent website from a malicious pop-up display or advertisement. Accordingly, it may penalize the user because of an unintended operation input to such pop-up display and the like.

In operation of the personal computers (PC), unlike the mobile terminals, it is possible to perform operation input to small keys and buttons displayed on a relatively large display screen (monitor) by using an input device such as a mouse. In this case, a display area of objects such as the keys and the buttons and that of the pop-up advertisement are relatively small in comparison to an entire display screen. Accordingly, even if the objects such as the keys and the buttons and the pop-up advertisement are suddenly displayed on the display screen, the probability for them to overlap an object the user intended to input may be low.

As for the mobile terminal, however, since portability is valued, the display screen is limited in size and thus the touch panel in a large size is not normally mounted. In addition, in consideration of the operability, objects such as keys and buttons displayed on the touch panel cannot be too small. Accordingly, in case of the mobile terminal, it is a prominent problem that an interrupting object, suddenly displayed on the touch panel, overlaps another object to which the user intends to input.

In order to avoid a risk to receive an unintended input from the user as stated above, there is suggested an input apparatus capable of switching validation/invalidation of an operation by the touch panel (for example, see Patent Document 2). A shown in FIG. 10(A), the Patent Document 2 discloses an input apparatus 100 having a touch panel 310 with an input unit 340 on top of a display unit 320.

PRIOR ART DOCUMENTS

Patent Documents

Patent Document 1: Japanese Patent Laid-Open No. 2006-311224
Patent Document 2: Japanese Patent Laid-Open No. 08-076925

SUMMARY OF INVENTION

Technical Problem

As shown in FIG. 10(A), the input apparatus 100 described in Patent Document 2 has an area for an operation validating switch unit 400 for validating an operation input, at a part of the input unit 340. The operation validating switch unit 400 receives an operation input by the user to validate/invalidate an operation input to the input unit 340. The input apparatus 100 validates an input to the input unit 340 if the operation validating switch unit 400 is ON, whereas it invalidates the input to the input unit 340 if the operation validating switch unit 400 is OFF. The Patent Document 2 also discloses an input apparatus 100 having the operation validating switch unit 400 separately from the input unit 340, as shown in FIG. 10(B).

As stated above, the input apparatus 100 described in Patent Document 2 can invalidates the operation input to the input unit 340 of the touch panel 310 based on an operation of the operation validating switch unit 400 by the user. Accordingly, if the user does not intend the operation input using the touch panel 310, it is possible to avoid an erroneous operation unintended by the user by invalidating the input unit 340.

However, the input apparatus 100 described in Patent Document 2 sets in advance validation/invalidation of input to the touch panel based on user's intention. Therefore, it is not possible to completely handle the incoming call and the pop-up advertisement suddenly displayed on the screen in the interrupting manner as stated above (as shown in FIG. 9).

That is, the input apparatus described in the above Patent Document 2 requires a user to set in advance invalidation of input to the touch panel in order to avoid an input to the incoming call screen or the pop-up advertisement. Accordingly, it is not possible to handle the incoming call screen or the pop-up advertisement suddenly displayed on the touch panel in the interrupting manner while the user inputs using the touch panel such as when writing a message.

In addition, although the input apparatus described in the above Patent Document 2 can prevent the input to the incoming call screen and the pop-up advertisement suddenly displayed by setting in advance invalidation of input to the touch panel. However, since such setting disables normal operation inputs as well, the user cannot input to the incoming call screen or the pop-up display based on the user's own intention. In order to respond to the incoming call screen or the pop-up display displayed in an interrupting manner, it is necessary for the user first to perform an operation input to validate inputs (that is, an operation input to cancel invalidation) to the touch panel separately. It inconveniences the user when the user wishes to answer the incoming call immediately.

A main characteristic of the touch panel is to be capable of providing high operability allowing a free configuration of a user interface with the objects such as the keys and the buttons arranged (displayed) as desired. However, it may diminish advantages of the touch panel such as easy operation and convenience to provide a switch separately from keys and buttons for receiving operation inputs to the touch panel and to require the user to operate the switch to validate/invalidate inputs to overall touch panel.

Accordingly, an object of the present invention in consideration of such conditions is to provide an input apparatus capable of receiving operation inputs intended by the user while avoiding operation inputs unintended by the user, without diminishing the advantages of the touch panel having the input unit and the display unit.

Solution to Problem

In order to achieve the above object, an input apparatus according to a first aspect of the present invention includes:

a display unit for displaying an input object;

an input unit for receiving a pressure input to the input object displayed on the display unit;

a load detection unit for detecting a pressure load on the input unit; and a control unit for controlling to receive the pressure input when the pressure load detected by the load detection unit satisfies a load standard, wherein the control unit controls such that a load standard for receiving a pressure input to an input object displayed on the display unit in an interrupting manner is higher than a load standard for receiving a pressure input to the input object which has been displayed on the display unit.

DESCRIPTION OF EMBODIMENTS

Embodiments of the present invention will be described with reference to the accompanying drawings. In the following embodiments, a mobile phone is used as an exemplary mobile terminal with an input apparatus according to the present invention. However, the mobile terminal to which the input apparatus according to the present invention is applicable is not only the mobile phone but also any mobile terminal having a touch panel such as a PDA, for example. In addition, the present invention is applicable not only to the mobile terminal having the touch panel but also to any input terminal having the touch panel such as ATMs of a bank and ticket vending machines at a train station as stated above.

Figure 1:
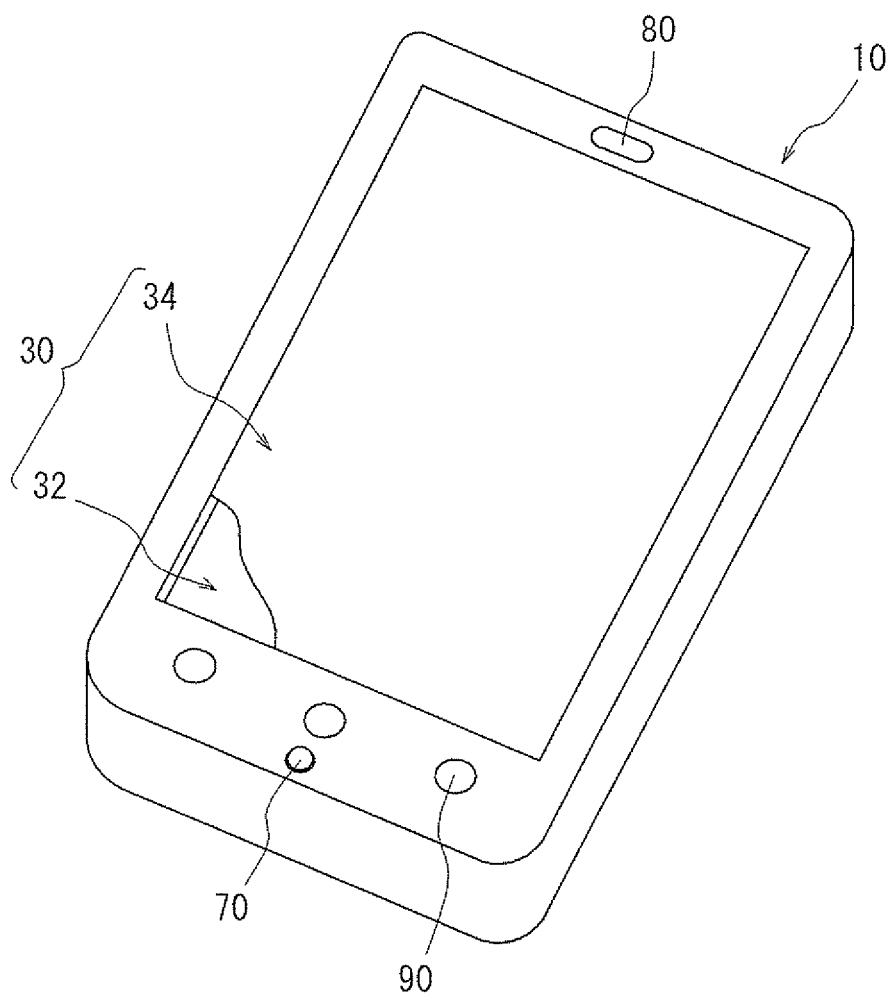
FIG. 1 is an external perspective view of a mobile phone having an input apparatus according to an embodiment of the present invention.

FIG. 1 is an external perspective view illustrating a schematic configuration of a mobile phone 10 having the input apparatus according to an embodiment of the present invention. The mobile phone 10 has a display unit 32, a part of which is displayed in the figure, on a front face of a terminal body, for displaying a variety of information and graphical images of keys and buttons on a liquid crystal display (LCD), an organic EL display or the like. The mobile phone 10 also has an input unit 34 constituted of a matrix switch and the like for receiving an input by a user's finger or a stylus at a front face of the display unit 32. According to the present embodiment, a touch panel 30 includes the display unit 32 and the input unit 34. The mobile phone 10 further includes an audio input unit 70 constituted of a microphone and the like, an audio output unit 80 constituted of a speaker and the like, and a key input unit 90 constituted of at least one mechanical key.

Although the mobile phone 10 may additionally have a digital camera function unit, a One-seg broadcast tuner, a Near Field Communication unit such as an infrared communication function unit, various interfaces and the like according to necessary functions, figures and detailed descriptions thereof are omitted.

Figure 2:
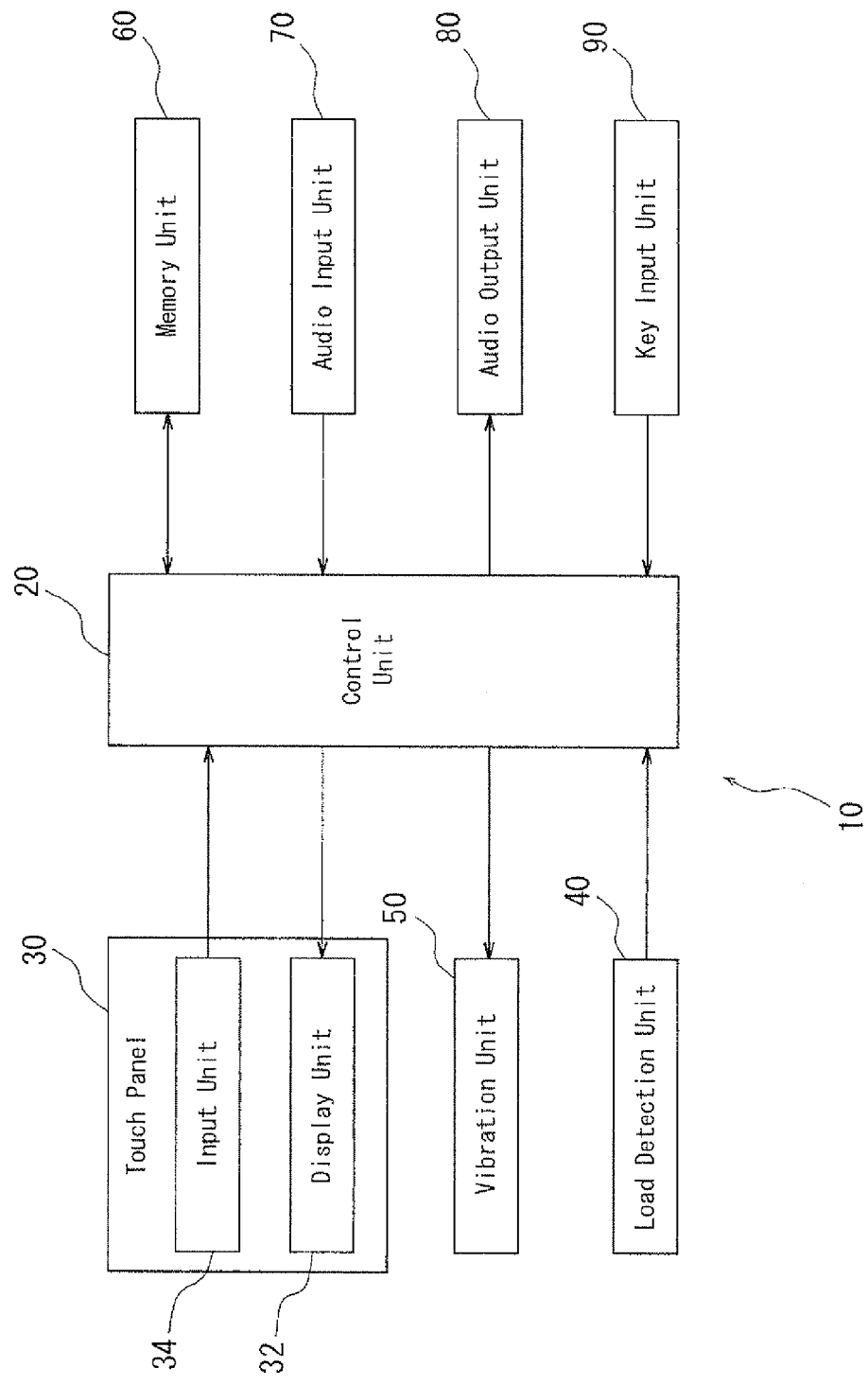
FIG. 2 is a functional block diagram illustrating an internal configuration of the mobile phone according to the embodiment of the present invention.

FIG. 2 is a functional block diagram illustrating a schematic internal configuration of the mobile phone 10. As shown in FIG. 2, the mobile phone 10 has a control unit 20, a touch panel 30, a load detection unit 40, a vibration unit 50, a memory unit 60, the audio input unit 70, the audio output unit 80 and the key input unit 90. The control unit 20 controls and manages the entire mobile terminal 10 as well as each functional block of the mobile terminal 10. As stated above, the touch panel 30 has a structure that the input unit 34 for receiving input from a user is arranged overlapping the front face of the display unit 32. Thereby, the touch panel 30 receives operation inputs by the user as well as displaying a variety of information such as a result of an input according to each application program (hereinafter, abbreviated to an "application").

The input unit 34 of the touch panel 30, upon detection of an input by a contact (pressure) of a user's finger or a stylus, outputs a signal corresponding to a position where such input is detected. The touch panel 30 is made as a know type such as, for example, a resistance film type, a capacitance type or the like. The display unit 32 performs display according to each application, as well as displaying a graphical image of user interface, composed of various keys and buttons for receiving operation inputs to the input unit 34 by the user, in a predetermined display area. Hereinafter, the graphical images of various keys, buttons and pop-up advertisements displayed on the display unit 32 for receiving an operation input to the input unit 34 of the touch panel 30 by the user are referred to as "input objects".

The load detection unit 40 may be a strain gauge sensor, for example, and detects a pressure load on the touch panel 30 (or the input unit 34). The vibration unit 50 may be, for example, a piezoelectric element or an ultrasonic transducer and vibrates the touch panel 30. A constitutional relationship among the load detection unit 40, the vibration unit 50 and the touch panel 30 will be described below.

The memory unit 60 stores various applications and a variety of input information, as well as functioning as a work memory. In addition, the memory unit 60 also stores a plurality of templates including various input objects to be used according to each application.

The audio input unit 70 converts user's voice and the like into input signals and transmits them to the control unit 20. The audio output unit 80 converts voice signals transmitted from the control unit 20 into voice. The key input unit 90 transmits a signal corresponding to an operation input by the user to the control unit 10. Usages and functions of the various keys constituting the key input unit 90 are defined according to an application to be used.

The mobile phone 10 further includes various function units necessary for providing functions as a usual mobile phone such as an antenna and a wireless communication unit for transmitting and receiving a variety of information such as voice call and e-mail data to/from a base station via the internet, wireless communication and the like. However, since such function units have no particular distinction from known arts, descriptions thereof are omitted.

Next, the constitutional relationship among the load detection unit 40, the vibration unit 50 and the touch panel 30 is described.

Figure 3:
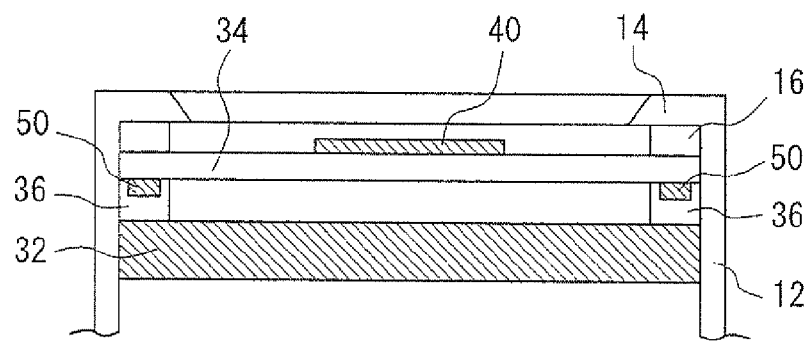
FIG. 3 shows diagrams illustrating an exemplary implementation structure of a touch panel, a load detection unit and a vibration unit of the mobile phone shown in FIG. 2.
Figure 3:
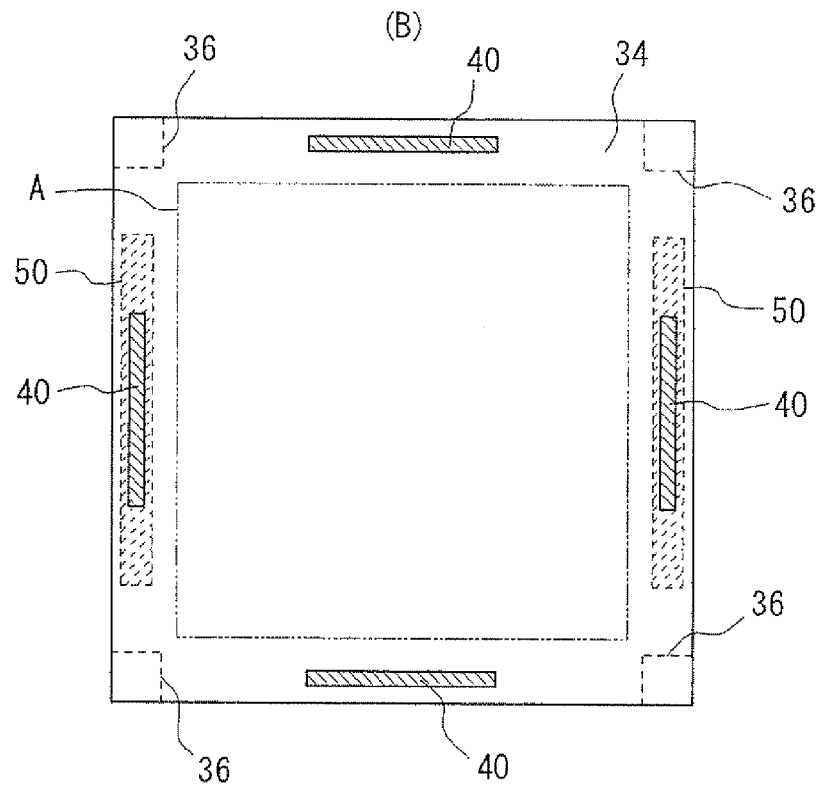

FIG. 3 is a diagram illustrating an exemplary implementation structure of the touch panel 30, the load detection unit 40 and the vibration unit 50 of the mobile phone 10 shown in FIG. 2. FIG. 3(A) is a cross-sectional view of a main section, whereas FIG. 3(B) is a plane view of the main section.

The display unit 32 for displaying various input objects on the touch panel 30 is housed in a housing 12. In the input apparatus according to the present embodiment, the input unit 34 is supported on the display unit 32 via insulators 36 made of elastic members. In the input apparatus according to the present embodiment, the display unit 32 and the input unit 34 are rectangular in a planar view. Although the touch panel 30 is square in FIG. 3, it may be oblong in accordance with specifications of the mobile terminal mounting the touch panel 30. In the input apparatus, the input unit 34 is supported on the display unit 32 via the insulators 36 arranged at four corners outside a display area A of the display unit 32 indicated by virtual lines in FIG. 3(B).

In addition, in the input apparatus, the housing 12 is provided with an upper cover 14 for covering a surface area of the input unit 34 outside the display area of the display unit 32. Insulators 16 made of elastic members are arranged between the upper cover 14 and the input unit 34.

The input unit 34 has a surface, that is, a face for receiving input operations, formed of a transparent film, and a rear face formed of a glass. The input unit 34 may be designed such that the transparent film of the surface slightly bends (strains) in proportion to pressure when an operation face is pressed.

In addition, in the input apparatus according to the present embodiment, a strain gauge sensor for detecting the pressure load (pressure) applied on the input unit 34 is provided, adhered or the like, to the transparent film on the surface of the input unit 34 near each side covered by the upper cover 14. Moreover, in the input apparatus, the piezoelectric element or the ultrasound transducer for vibrating the input unit 34 is provided, adhered or the like, to the face of the glass on the rear side of the input unit 34 near each of two opposed sides. That is, in the input apparatus shown in FIG. 3, the load detection unit 40 and the vibration unit 50 shown in FIG. 2 include four strain gauge sensors and two vibrators, respectively. It is to be noted that the housing 12, the upper cover 14 and the insulator 16 shown in FIG. 3(A) are omitted in FIG. 3(B).

In the input apparatus according to the present embodiment, the control unit 20 monitors an input detected by the input unit 34 and a pressure load detected by the load detection unit 40. If a pressure input detected by the input unit 34 is an input to an input object displayed on the display unit 32 and the pressure load detected by the load detection unit 40 satisfies a predetermined standard for receiving an input, the control unit 20 receives such an input as a normal input. Hereinafter, this "standard for receiving an input" is referred to as a "load standard", simply. In addition, when the input satisfies the load standard, the control unit 20 controls the vibration unit 50 to generate vibration such that the vibration is given to an object pressing the input unit 34 such as the user's finger or the stylus. The load detection unit 40 detects the load from, for example, an average output value of the four strain gauge sensors. Additionally, the vibration unit 50 drives, for example, two ultrasound transducers in phase. Since the vibration unit 50 generates vibration when the load standard is satisfied, the user can recognize that the pressure input by the user is received appropriately.

Next, a summary of processing according to the present embodiment, carried out when interruption by an input object occurs, is described. Here, an "interruption" by the input object indicates a state in which, during reception of an input by the user to an input object being displayed based on operation by an application, another input object is displayed on the same screen based on activation of another application and the like. It is considered that such an "interruption" may occur when there is a request to display an input object on the same position of another input object displayed based on an application already running, other than a case where another application is activated. In order to carry out the processing, the control unit 20 first predefines the load standard for determining an input to the input unit 34 as a normal input to the input object displayed on the display unit 32 before the interruption occurs. The following is a description of the load standard.

Figure 4:
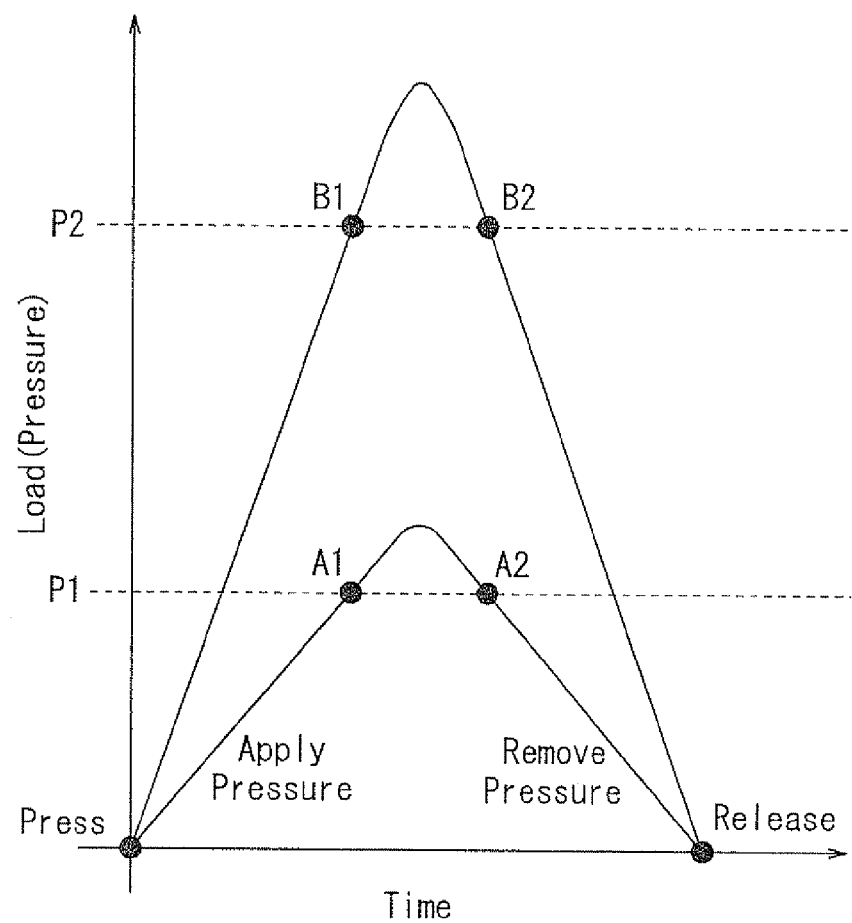
FIG. 4 is a graph schematically illustrating an exemplary chronological change in a load (pressure) detected by the load detection unit when a user presses an input unit of the touch panel.

FIG. 4 is a graph schematically illustrating an exemplary chronological change in the pressure load (pressure) detected by the load detection unit 40 when the user performs operation inputs by pressing the input unit 34 of the touch panel 30. Generally, when performing operation to press (pressure input) the input unit 34 of the touch panel 30, the user continues to increase pressure on the input unit 34 (that is, the user presses the input unit 34 down) from when the user touches the input unit 34 until determining that the input is received. From a point determining that the input is received, the user reduces the pressure on the input unit 34 (that is, releases a finger or the like from the input unit 34). Accordingly, as represented by a curved line shown in FIG. 4, the load detected by the load detection unit 40 is first increased upward and then reduced downward with time passing from the left side to the right side.

As a premise of the processing carried out when the interruption by the input object occurs, the control unit 20 first sets a load standard value P1 based on a normal pressure at a normal operation input to the display unit 32 (or the input unit 34) by the user. Based on this setting, when the load detection unit 40 detects a pressure load exceeding the P1 (A1), which is the normal pressure at the normal operation input by the user, the control unit 20 determines that the input object displayed on the display unit 32 is pressed. In addition, if the load detection unit 40 detects that the load pressure on the input object being pressed drops under the P1 (A2) (after A1), the control unit 20 determines that the operation input to the input object being pressed down is completed (confirmed).

It is preferred to use the load standard value P1 as a load standard value for operation inputs not only before the interruption by the input object but also when there is a normal operation input to the input unit 43 (that is, when the interruption by the input object does not occur). Setting the load standard value P1 as stated above prevents from determining a slight touch to the input unit 34 by the user as an input, thereby an unintended input by the user may be avoided.

In addition, setting the load standard value P1 as stated above enables the user to perform a repetitive tapping by pressing the same spot (the same input object) on the input unit 34 multiple times continually, without releasing the finger from the input unit 34 each time. That is, even if the user's finger keeps touching the input unit 34, the user can make the input unit 34 recognize such an input as the repetitive tapping, by adjusting strength of pressure by the finger to increase and decrease across the load standard value P1. Since this input method needs only small strokes of the user's finger, the user mastering this method may quickly and easily input with a smaller movement of the finger.

Next, according to the present embodiment, the control unit 20 sets a load standard value P2 based on a pressure larger than the normal pressure at the normal operation input to the input unit 34 by the user. According to the present embodiment, a pressure exceeding the load standard value P2 set in this manner is received as an input in the processing carried out when the interruption by the input object occurs. When the load detection unit 40 detects a pressure load exceeding the P2 (B1), which is larger than the normal pressure (P1) at the normal operation input by the user, on an input object displayed in an interrupting manner, the control unit 20 determines that the input object is pressed. In addition, if the load detection unit 40 detects that the pressure load on the input object being pressed down drops under the P2 (B2) (after B1), the control unit 20 determines that the operation input to the input object being pressed down is completed (confirmed). That is, the control unit 20 controls such that the load standard for receiving a pressure input to the input object displayed in the interrupting manner on the display unit 32 is higher than the load standard for receiving a pressure input to the input object which has been displayed on the display unit 32.

Accordingly, even if the input object displayed in the interrupting manner is pressed with a normal pressure (under P2) at the normal input operation by the user, the control unit 20 does not receive such a pressure input as an input to this object. However, only if a pressure exceeding the P2 larger than the normal pressure (P1) of the normal operation input by the user is applied on this input object, the control unit 20 accepts such a pressure input as an input.

In the above description, the load standard value is used as a "pressure load threshold" and it is determined that "the load standard is satisfied" if it is exceeded, by way of example. Although a determination in this manner is applied in the following descriptions, there may also be other conditions to determine that "the load standard is satisfied". For example, it is possible to determine that "the load standard is satisfied" if the pressure load of the pressure input to an input object by the user reaches the above load standard value. In addition, it is also possible to determine that "the load standard is satisfied" if the pressure load indicating the above load standard value is detected by the load detection unit 40.

Figure 5:
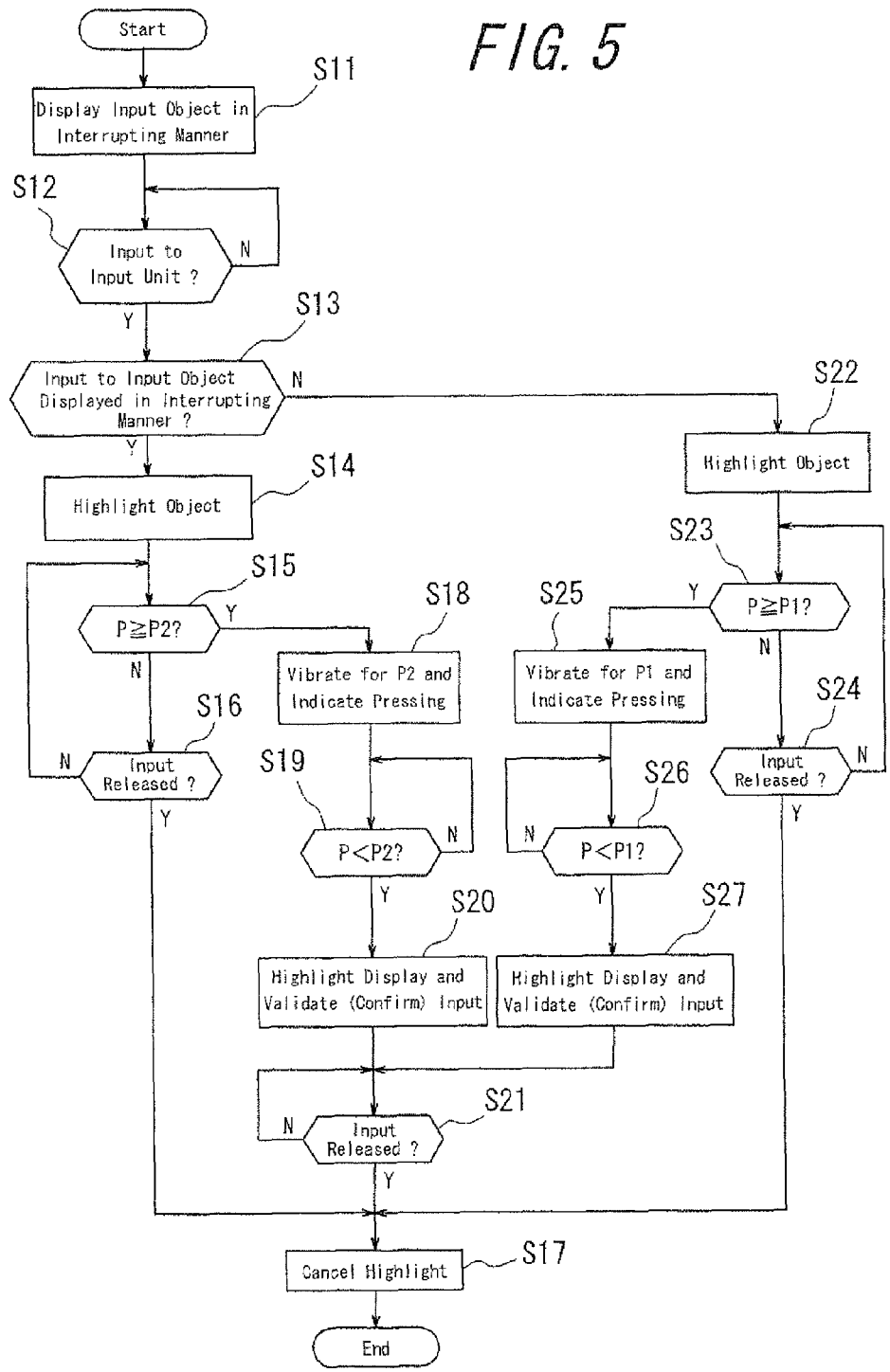
FIG. 5 is a flowchart illustrating processing and operation according to the present embodiment.

Next, the processing and operations carried out when the interruption by an input object occurs is described. FIG. 5 is a flowchart illustrating the processing and the operations of the input apparatus according to the present embodiment carried out when the interruption by an input object occurs. The following is a description of a case that an input object is displayed in the interrupting manner while a message creation application is running to display character input objects on the display unit 32 and inputs to the input unit 34 by the user are received.

It is considered that the interruption by an input object occurs when, for example, an application to inform the user of reception of an incoming call or a new message is activated, as stated above. Activation of the application based on an input intended by the user is not regarded as the interruption by the input object. In addition, it is also considered that a request to display an entry form, a pop-up window or the pop-up advertisement interrupts a web browser application which has been running. Since the processing and the operations in response to a normal operation input except the processing when the interruption by an input object occurs are the same as those of conventional arts, descriptions thereof are omitted.

According to the present embodiment, upon start of the processing for when the interruption by the input object occurs, the control unit 20 first displays the input object on the display unit 32 of the touch panel 30 in the interrupting manner (step S11). Then, the control unit 20 determines whether an input by a user's finger or a stylus (hereinafter, abbreviated to a "user's input") to the input unit 34 of the touch panel 30 is detected (step S12).

If the user's input to the input unit 34 is detected at step S12, the control unit 20, based on an input from the input unit 34, determines a position on the display unit 32, corresponding to a position on the input unit 34 received the input (step S13). In addition, based on a result of such determination, the control unit 20 determines whether the position on the display unit 32 corresponding to the position where the input is detected corresponds to a position of the input object displayed in the interrupting manner. If such input position corresponds to the position of the input object displayed in the interrupting manner (Yes of step S13), the control unit 20 highlights this input object (step S14).

Figure 6:
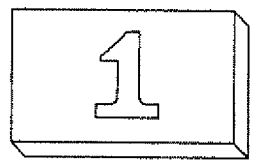
FIG. 6 is a diagram illustrating a highlight display and a pressed-down display according to the present embodiment.
Figure 6:
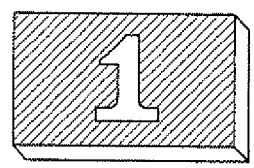
Figure 6:
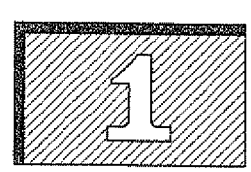

The highlight display at step S14 is an emphasizing display in order to inform the user that a finger or the like touches the input object. For example, when the user's input to the input object of a numeric key as shown in FIG. 6(A) is detected, the control unit 20 highlights the input object as shown in FIG. 6(B). Thereby, the user can visually recognize that the input by the finger or the like touching the input unit 34 is appropriately detected by the input apparatus. Such highlight display indicates a state that the user's finger or the like is simply touching the input unit 34 and, hence, it is not yet recognized at this point that the input is received (that is, the key is pressed).

Next, the control unit 20 determines whether the pressure load value P detected by the load detection unit 40 exceeds the load standard value P2 (step S15). For the input object displayed in the interrupting manner, the control unit 20 does not perform the processing for when an input is received unless there is an input exceeding the load standard value P2. Accordingly, if the pressure load value P exceeding the load standard value P2 is not detected by the load detection unit 40 at step S15, the control unit 20 determines whether the user's input to the input unit 34 is released (step S16).

If it is determined at step S16 that the input is not released (that is, the user has not released the finger or the like from the input unit 34), the control unit 20 returns to step S15 to monitor the pressure load value P detected by the load detection unit 40. If it is determined at step S16 that the user's input to the input unit 34 is released, it is regarded that there is no input to the input object touched by the user and the control unit 20 cancels the highlight display (step S17) and ends the processing.

Cancellation of the highlight display at step S17 is a display to inform the user that the input by the user's finger or the like to the input unit 34 at a position corresponding to the input object is no longer detected. For example, the control unit 20 cancels the highlight display of the input object to which the user's input is detected, on the display unit 32 and returns to a display as shown in FIG. 6(A). Thereby, the user can visually recognize that the input apparatus appropriately detects that the user's finger or the like which was touching the input unit 34 is now released from the input unit 34.

In contrast, if the pressure load value P exceeding the load standard value P2 is detected by the load detection unit 40 at step S15, the control unit 20 controls the vibration unit 50 to vibrate in order to inform the user of the pressure load value P exceeding the load standard value P2 (step S18). Although a vibration generated by the vibration unit 50 in this case may be in the same pattern as vibrations for any input types of inputs, it is preferred to vibrate in a specific pattern such that the user can recognize that the pressure load value P exceeds the load standard value P2.

In addition, the control unit 20, at step S18, changes display of the display unit 32 in order to indicate that the input object to which the input is detected is pressed. That is, the control unit 20 switches display from the highlight display of the input object as shown in FIG. 6(B) to the display indicating that the input object is pressed as shown in FIG. 6(C). Thereby, the user can visually recognize that the pressure input by the user's finger or the like touching the input unit 34 is appropriately received as a pressure input to the input object by the input apparatus.

After step S18, the control unit 20 determines whether the pressure of the user's input to the input unit 34 is reduced and the pressure load value P detected by the load detection unit 40 becomes equal to or lower than the load standard value P2 (step S19). If it is determined at step S19 that the pressure load value P becomes equal to or lower than the load standard value P2, the control unit 20 accepts that the operation input, being received, to the input object displayed in the interrupting manner is confirmed (step S20). That is, in the input processing according to the present embodiment, if compared to a mechanical key, reception of an input to a key is not confirmed when the key is pressed down but is confirmed when the key is released.

At step S20, in addition, the control unit 20 returns the display of the display unit 32 to the highlight display in order to indicate that the pressure on the input object to which the input is detected is released. That is, for example, the control unit 20 returns the display indicating that the input object is pressed as shown in FIG. 6(C) to the highlight display of the input object as shown in FIG. 6(B). Thereby, the user can visually recognize that the pressure input to the input object is confirmed as the input and that the input apparatus appropriately recognizes that the pressure on the input object is reduced.

After step S20, the control unit 20 determines whether the user's input to the input unit 34 is released (step S21). If it is determined at step S21 that the input is not released (that is, the user has not released the finger or the like from the input unit 34), the control unit 20 continues to monitor the pressure load value P detected by the load detection unit 40. If it is determined at step S21 that the user's input to the input unit 34 is released, the control unit 20 shifts to the above step S17 to cancel the highlight display and ends the processing.

As stated above, after confirmation of the operation input at the pressure load exceeding the P2 to the input object displayed in the interrupting manner, with regard to all input objects including this input object, an input is received at a normal pressure load exceeding the P1. That is, it is preferred that the processing according to the present embodiment is carried out for an input object first displayed in the interrupting manner when there is no other input object displayed in that manner. Thereby, it can adequately avoid the unintended input by the user. In addition, it allows the user to continue the input operation with a normal light pressure after the user once confirmed the input to the input object displayed in the interrupting manner with an intended pressure input at a heavy pressure load (exceeding the P2).

On the other hand, if at step S13 the input position does not correspond to the position of the input object displayed in the interrupting manner, the control unit 20 shifts to step S22 to highlight a corresponding input object. It is to be noted that the processing shifts from step S13 to step S22 if the user's input to the input object is detected but the input object is not displayed in the interrupting manner. In this case, the input object is highlighted in the same manner as the highlight display at step S14.

Next, the control unit 20 determines whether the pressure load value P detected by the load detection unit 40 exceeds the load standard value P1 (step S23). For the input object not displayed in the interrupting manner, if there is an input exceeding the load standard value P1 but smaller than the P2, the control unit 20 carries out the processing for when the input is received in the same manner as the normal operation input. Accordingly, if the load pressure value P exceeding the load standard value P1 is not detected by the load detection unit 40 at step S23, the control unit 20 determines whether the user's input to the input unit 34 is released (step S24).

If it is determined at step S24 that the user's input is not released (that is, the user's finger or the like is not released from the input unit 34), the control unit 20 returns to step S23 to monitor the pressure load value P detected by the load detection unit 40. If it is determined at step S24 that the user's input to the input unit 34 is released, the control unit 20 regards that there is no input to the input object the user was touching, cancels the highlight display (step S17) and then ends the processing.

In contrast, if the pressure load value P exceeding the load standard value P1 is detected by the load detection unit 40 at step S23, the control unit 20 controls the vibration unit 50 to vibrate in order to inform the user of the pressure load value P exceeding the load standard value P1 (step S25). In this case also, although the vibration generated by the vibration unit 50 may be in the same pattern as that for any types of inputs, it is preferred to vibrate in a specific pattern such that the user can recognize that the pressure load value P exceeds the load standard value P1.

At step S25, additionally, the control unit 20 changes the display of the display unit 32 to indicate that the input object to which the input is detected is pressed. That is, for example, the highlight display of the input object as shown in FIG. 6(B) is switched to the display indicating that the input object is pressed as shown in FIG. 6(C). Thereby, the user can visually recognize that the input apparatus appropriately receives the pressure input by the user's finger or the like touching the input unit 34 as an input to the input object.

After step S 25, the control unit 20 determines whether the pressure of the user's input to the input unit 34 is reduced and the pressure load value P detected by the load detection unit 40 becomes equal to or lower than the load standard value P1 (step S26). If it is determined at step S26 that the pressure load value P becomes equal to or lower than the load standard value P1, the control unit 20 accepts that the operation input to the input object currently receiving the input is confirmed (step S27).

At step S27, additionally, the control unit 20 returns the display of the display unit 32 to the highlight display in order to indicate that the pressure on the input object to which the input is detected is released. That is, for example, the control unit 20 returns the display indicating that the input object is pressed as shown in FIG. 6(C) to the display highlighting the input object as shown in FIG. 6(B). Thereby, the user can visually recognize that the pressure input to the input object is confirmed as an input, and that the input apparatus appropriately recognizes that the pressure on the input object is reduced.

After step S27, the control unit 20 determines whether the user's input to the input unit 34 is released (step S21). If it is determined at step S21 that the input is not released (that is, the user has not released the finger or the like from the input unit 34), the control unit 20 continues to monitor the pressure load value P detected by the load detection unit 40. If it is determined at step S21 that the user's input to the input unit 34 is released, the control unit 20 shifts to the above step S17 to cancel the highlight display and ends the processing.

Figure 7:
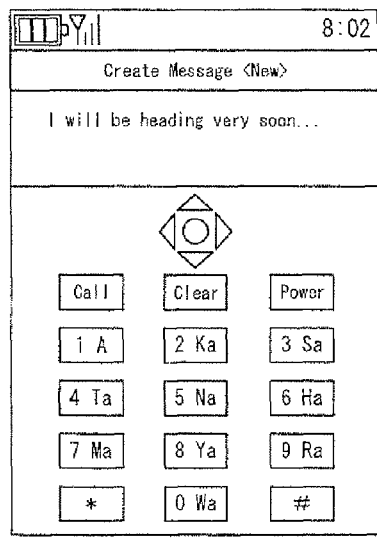
FIG. 7 shows exemplary displays of a display unit based on the processing according to the present embodiment.
Figure 7:
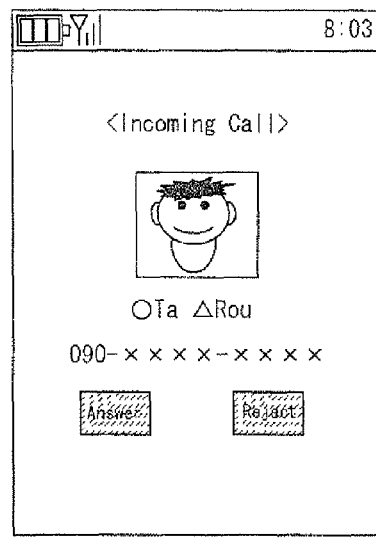
Figure 7:
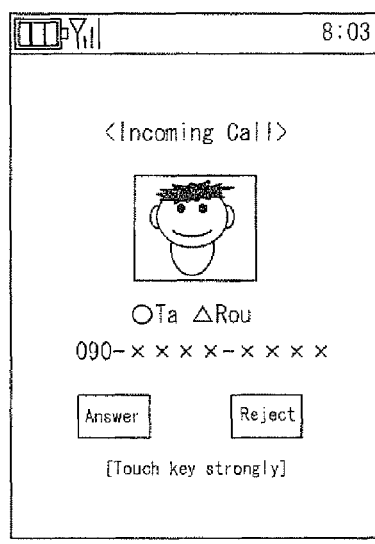

The operations by the processing as stated above will be described in detail by using a typical embodiment. As shown in FIG. 7(A), for example, it is assumed that the message creation application is running to display the character input objects on the display unit 32 of the touch panel 30 and the user's input to the input unit 34 is being received. The normal operation input such as a character input to create a message as stated above is performed at a pressure load exceeding the load standard value P1 at 1 N (Newton), for example, based on the normal pressure of the normal operation input by the user.

It is assumed that an incoming call is received while the character input is received by the message creation application. When the incoming call is received, an application for a telephone call is activated and input objects "Answer" and "Reject" are displayed in the interrupting manner as shown in FIG. 7(B). In order to input effectively to the input object displayed in the interrupting manner, the user needs to perform an operation input at a pressure load exceeding the load standard value P2 (B1), which is 3 N for example, larger than the normal pressure (P1) of the normal operation input.

Accordingly, even if the user inputs to the input unit 34 being unaware of an incoming call screen suddenly displayed during the character input to create a message, such an unintended input to the "Answer" key or the "Reject" key is not received. Also, even if the user inputs to the input unit 34 as it is too late to change operation from being aware of the incoming call screen suddenly displayed while the user inputs characters in a message, such an unintended input to the key is not received, either.

According to the present embodiment, as stated above, a load greater (heavier) than the pressure load based on the normal operation input is set only for a first pressure input to the input object displayed in the interrupting manner on the display unit 32. A type of such an input by the pressure load greater (heavier) than that of the normal operation input differs from various input types (for example, holding down and a double pressing such as a double click) regarded as normal input methods. Accordingly, since an input in one of the various input types regarded as the normal input methods to the input object displayed in the interrupting manner is not received, an incorrect input unintended by the user is not received as an effective input. That is, an input by an unintended operation by the user is avoided.

Additionally, if the user is aware of the incoming call screen suddenly displayed while inputting characters in a message, the user purposely performs the operation input with a pressure heavier to some extent than the normal pressure of the normal operation input. Thereby, the pressure input to the "Answer" key or the "Reject" key according to a user's intention is effectively received.

In the processing according to the present embodiment, when an input object is displayed in the interrupting manner, it is preferred to indicate, for the user, that this input object needs to be pressed with a pressure heavier than that of the normal operation input. For example, as the input objects of the "Answer" key and the "Reject" key shown in FIG. 7(B), it is possible to emphasize input objects being displayed in the interrupting manner by displaying the input objects on the display unit 32 at a display state with different colors or the like from keys of other input objects. It is also possible to display the input objects displayed in the interrupting manner on the display unit 32 together with a note such as "Touch key strongly", for example, as shown in FIG. 7(C).

Figure 8:
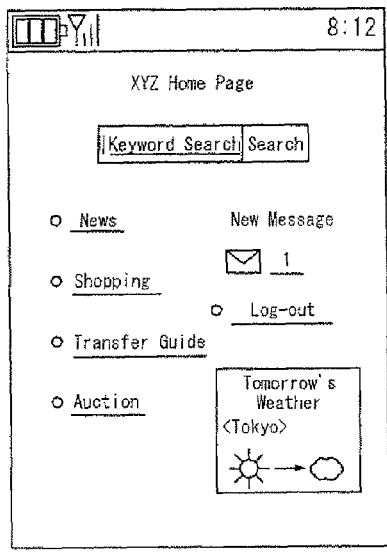
FIG. 8 shows other exemplary displays of the display unit based on the processing according to the present embodiment.
Figure 8:
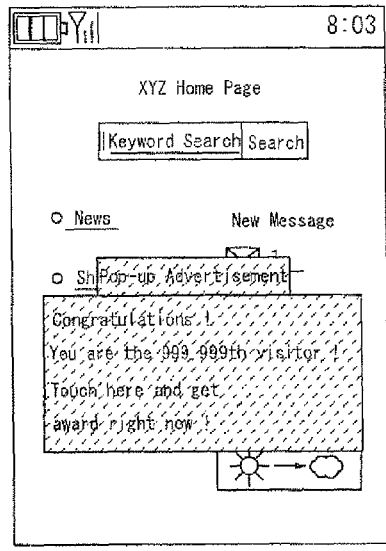
Figure 8:
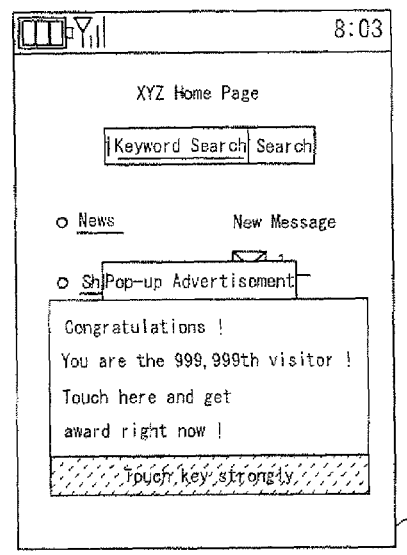
Figure 9:
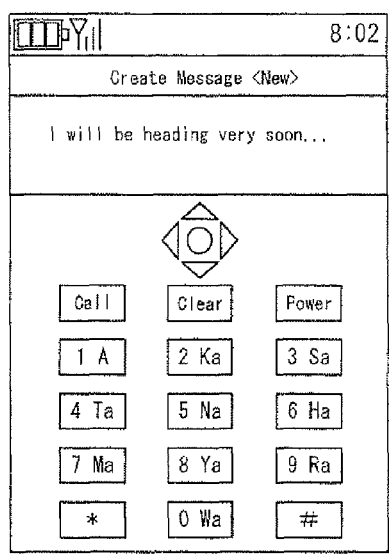
FIG. 9 shows exemplary displays of the display unit based on the processing by a conventional mobile phone.
Figure 9:
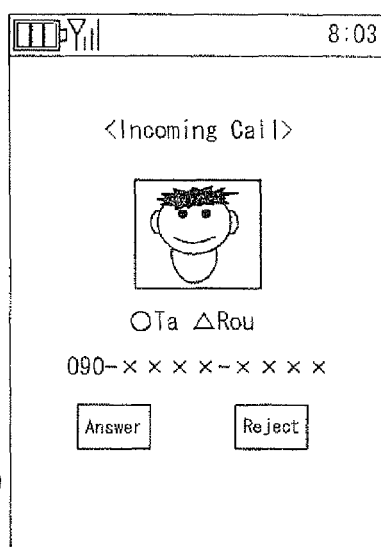
Figure 9:
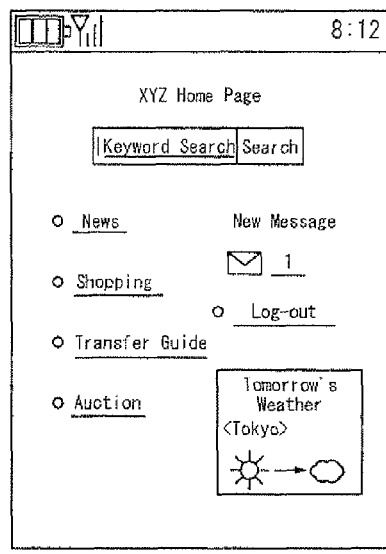
Figure 9:
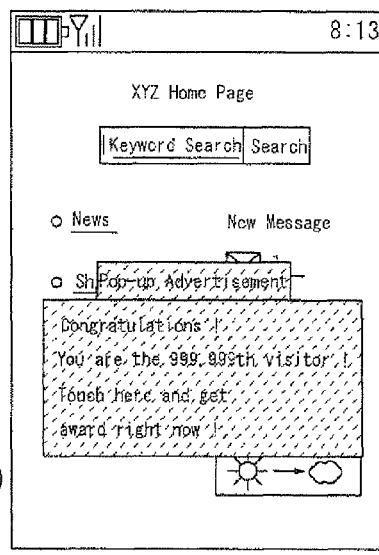
Figure 10:
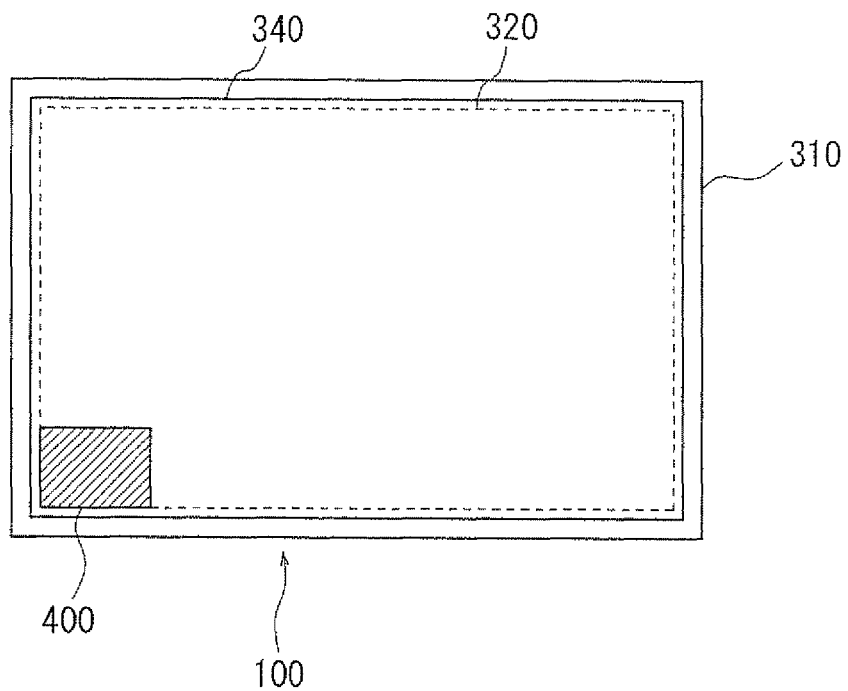
FIG. 10 shows external front views illustrating schematic configurations of a conventional input apparatus.
Figure 10:
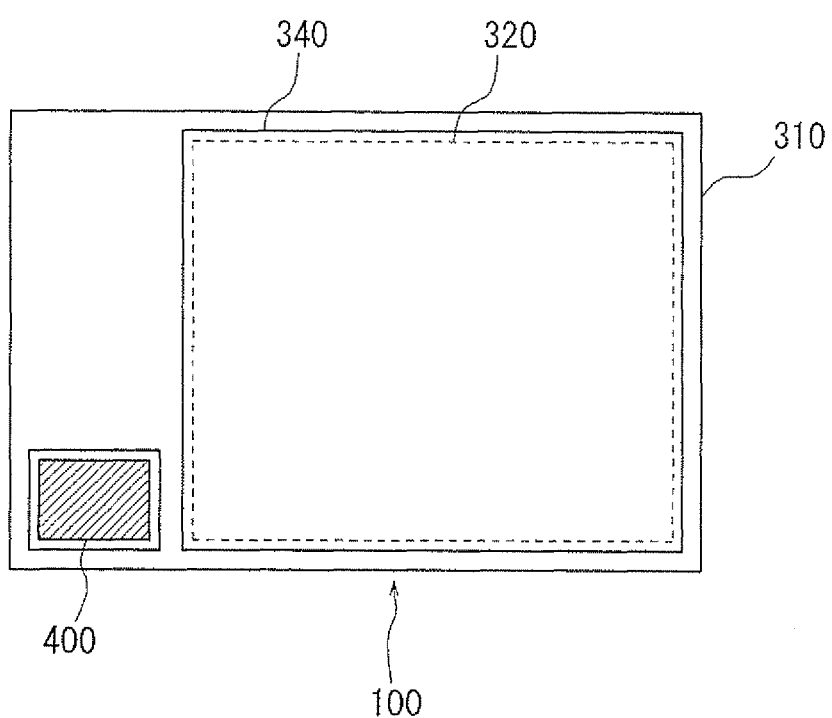

Now, another embodiment is described. It is assumed that the web browser application is running to display an internet website on the display unit 32 of the touch panel 30 and the user's inputs to the input unit 34 are being received as shown in FIG. 8(A), for example. In the screen shown in FIG. 8(A), underlined character strings (links) are input objects that allow the user to jump to another page (site) upon being pressed. The normal operation input such as a pressure input to the link to another page is performed by a pressure load exceeding the pressure standard value P1, which is 1 N for example, based on the normal pressure of the normal operation input by the user.

It is assumed that there is a request to the web browser application to display a pop-up advertisement while the pressure input to the link is performed using the application. When the request to display the pop-up advertisement is processed, the input object of the pop-up advertisement is displayed in the interrupting manner on the display unit 32 as shown in FIG. 8(B). In order that an input to the input object displayed in the interrupting manner is effectively received, it is necessary for the user to perform an operation input with a pressure load exceeding the load standard value P2 (B1), which is 3 N for example, greater than the normal pressure (P1) of the normal operation input.

Accordingly, even if the user inputs to the input unit 34 being unaware of the pop-up advertisement suddenly displayed at the moment that the user tires to press the link to jump, such an unintended input to the pop-up advertisement is not received. Also, even if the user inputs to the input unit 34 as it is too late to change operation from being aware of the pop-up advertisement suddenly displayed at the moment that the user tires to press the link to jump, such an unintended input to the pop-up advertisement is not received, either.

Additionally, if the user is aware of the pop-up advertisement suddenly displayed, the user purposely performs an operation input to it with a pressure heavier to some extent than the normal pressure of the normal operation input. Thereby, the input to the pop-up advertisement according to a user's intention is effectively accepted.

In the processing according to the present embodiment, when the input object such as the pop-up advertisement and the like is displayed in the interrupting manner, it is preferred to indicate, for the user, that this input object needs to be pressed with a pressure larger than that of the normal operation input. For example, as the input object of the pop-up advertisement shown in FIG. 8(B), it is possible to emphasize the input object being displayed in the interrupting manner by displaying the input object on the display unit 32 at a display state with different colors or the like from keys of other input objects. It is also possible to display the input object displayed in the interrupting manner on the display unit 32 together with the note such as "Touch key strongly", for example, as shown in FIG. 8(C).

There may be a case that a plurality of input objects such as input objects originally displayed and another input object displayed in the interrupting manner are mixed, as shown in FIGS. 8(B) and (C). In this case also, by the processing according to the present embodiment, the user can perform a normal operation input with a normal pressure exceeding the P1 to the input objects originally displayed. In contrast, an input to the input object displayed in the interrupting manner is not regarded as an input unless the pressure exceeds the P2 greater than that of the normal operation input. Accordingly, even when a plurality of input objects are mixed, it is possible to distinctively input to the input object originally displayed and an input to the input object displayed in the interrupting manner.

It is to be understood that the present invention is not limited to the embodiments set forth above but may be modified or varied in a multiple manner. For example, although in the above embodiments it is assumed to predefine the load standard values P1 and P2, it is desired to allow the user to change or adjust them appropriately as necessary. Thereby, it is possible to appropriately adjust the values later if the user feels uncomfortable about them during operation.

In the processing according to the above embodiment, it is determined that an input is not confirmed yet when the pressure load value exceeds the P1 or the P2 but it is confirmed when the pressure load falls down to equal to or less than the P1 or P2 after exceeding the P1 or the P2. However, it is also possible to simplify the processing by confirming the input at a point when the pressure load value reaches or exceeds the P1 or the P2.

In addition, in the above embodiments the vibration unit 40 is vibrated when the pressure load of the user's input exceeds the P1 or the P2, in order to inform the user accordingly. However, in such a case it is not essential to vibrate but it is possible to generate a specific sound from the audio output unit 80. Additionally, it is also possible to indicate that the pressure load of the user's input exceeds the P1 or the P2, by altering the color or a display state of the input object receiving the input on the display unit 32.

Moreover, in addition to embodiments described above, it is also possible to vibrate the vibration unit 40 at steps S20 and S27, for example, in order to indicate that user's input is appropriately processed.

INDUSTRIAL APPLICABILITY

According to the present invention, the load standard for receiving a pressure input to an input object displayed in the interrupting manner is set higher than the load standard for receiving a pressure input to a normal input object (not displayed in the interrupting manner). Thereby, it is possible to perform the normal pressure input to a normal input object (not displayed in the interrupting manner) based on a user's intention. In contrast, an operation input to an input object displayed in the interrupting manner is not received unless it has a pressure load satisfying the load standard higher than that for the normal input. Accordingly, it is possible to avoid an unintended operation input by the normal input to the input object suddenly displayed in the interrupting manner. In addition, in order to perform an input operation with intention of inputting to the input object displayed in the interrupting manner, the user performs a pressure input with a pressure load satisfying the load standard higher than that for the normal input. Thereby, the user can perform the operation input based on the user's intention.

REFERENCE SIGNS LIST

10 mobile phone
20 control unit
30 touch panel
32 display unit
34 input unit
40 load detection unit
50 vibration unit
60 memory unit
70 audio input unit
80 audio output unit
90 key input unit

The invention claimed is:

1. An input apparatus comprising:
   a display unit for displaying an input object;
   an input unit for detecting a pressure input to the input object displayed on the display unit;
   a load detection unit for detecting a pressure load on the input unit; and
   a control unit that controls to:
      set a first standard pressure load for receiving a pressure input to a first input object which has been displayed on the display unit;
      determine an occurrence of a display of a second input object to the display unit in an interrupting manner before a pressure input is detected to a first input object which has been displayed on the display unit; and
      set a second standard pressure load, that is higher than the first standard pressure load, for receiving a pressure input to the second input object based on a result of the determination, wherein the interrupting manner is not caused by any pressure input applied to the input unit.

2. The input apparatus of claim 1, wherein the interrupting manner includes a state in which when the first input object has been displayed on the display based on an operation by an application, the second object is displayed on the display based on an activation of another application.

3. A control method of an input apparatus comprising a display unit for displaying an input object, an input unit for detecting a pressure input to the input object displayed on the display unit, a load detection unit for detecting a pressure load on the input unit, the control method comprising the step of:

controlling by:
- setting a first standard pressure load for receiving a pressure input to a first input object which has been displayed on the display unit;
- determining an occurrence of a display of a second input object to the display unit in an interrupting manner before a pressure input is detected to a first input object which has been displayed on the display unit; and
- setting a second standard pressure load, that is higher than the first standard pressure load, for receiving a pressure input to the second input object based on a result of the determination, wherein the interrupting manner is not caused by any pressure input applied to the input unit.

* * * * *